(12) United States Patent
Phillips et al.

(10) Patent No.: US 6,987,590 B2
(45) Date of Patent: Jan. 17, 2006

(54) PATTERNED REFLECTIVE OPTICAL STRUCTURES

(75) Inventors: Roger W. Phillips, Santa Rosa, CA (US); Vladimir P. Raksha, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 68 days.

(21) Appl. No.: 10/666,318

(22) Filed: Sep. 18, 2003

(65) Prior Publication Data

US 2005/0063067 A1   Mar. 24, 2005

(51) Int. Cl.
G03H 1/00   (2006.01)

(52) U.S. Cl. .................... 359/2; 359/567; 359/613; 430/10; 283/86; 428/29; 428/916

(58) Field of Classification Search ............... 359/2, 359/567, 613–614; 430/10; 283/86; 428/29, 428/916
See application file for complete search history.

(56) References Cited

U.S. PATENT DOCUMENTS

| | | |
|---|---|---|
| 3,011,383 A | 12/1961 | Sylvester et al. |
| 4,066,280 A | 1/1978 | LaCapria |
| 4,126,373 A | 11/1978 | Moraw |
| 4,155,627 A | 5/1979 | Gale et al. |
| 4,168,983 A | 9/1979 | Vittands et al. |
| 4,434,010 A | 2/1984 | Ash |
| 4,705,300 A | 11/1987 | Berning et al. |
| 4,705,356 A | 11/1987 | Berning et al. |
| 4,721,217 A | 1/1988 | Phillips et al. |
| 4,756,771 A | 7/1988 | Brodalla et al. |
| 4,779,898 A | 10/1988 | Berning et al. |
| 4,838,648 A | 6/1989 | Phillips et al. |
| 4,930,866 A | 6/1990 | Berning et al. |
| 5,002,312 A | 3/1991 | Phillips et al. |
| 5,009,486 A | 4/1991 | Dobrowolski et al. |
| 5,059,245 A | 10/1991 | Phillips et al. |

(Continued)

FOREIGN PATENT DOCUMENTS

DE   4343387   6/1995

(Continued)

OTHER PUBLICATIONS

John M. McKiernan, et al., "Luminescence and Laser Action of Coumarin Dyes Doped in Silicate and Aluminosilicate Glasses Prepared by the Sol-Gel Technique," Journal of Inorganic and Organometallic Polymers, vol. 1, No. 1, 1991, pp. 87-103.

(Continued)

*Primary Examiner*—Leonidas Boutsikaris
(74) *Attorney, Agent, or Firm*—Allen, Dyer, Doppelt, Milbrath & Gilchrist, P.A.

(57) ABSTRACT

An optical structure includes a light transmissive substrate having a surface relief pattern applied thereon, such as a hologram. A patterned layer of a reflective material is applied over portions of the surface relief pattern so as to form alphanumeric characters, bars codes, or pictorial or graphical designs. An optically active coating is applied over the patterned layer of reflective material and exposed portions of the surface relief pattern in order to provide desirable optical effects to the exposed portions of the surface relief pattern. In some embodiments, the optically active coating is a color shifting thin film, or contains color shifting flakes. Optionally, the material of the optically active coating is index matched to the light transmissive substrate in order to optically erase the effect of the surface relief pattern in the portions of the surface relief pattern not covered by the reflective material.

14 Claims, 4 Drawing Sheets

U.S. PATENT DOCUMENTS

| | | |
|---|---|---|
| 5,084,351 A | 1/1992 | Phillips et al. |
| 5,106,125 A | 4/1992 | Antes |
| 5,128,779 A | 7/1992 | Mallik .......................... 359/2 |
| 5,135,812 A | 8/1992 | Phillips et al. |
| 5,142,383 A | 8/1992 | Mallik .......................... 359/2 |
| 5,171,363 A | 12/1992 | Phillips et al. |
| 5,214,530 A | 5/1993 | Coombs et al. |
| 5,254,390 A | 10/1993 | Lu |
| 5,278,590 A | 1/1994 | Phillips et al. |
| 5,279,657 A | 1/1994 | Phillips et al. |
| 5,339,737 A | 8/1994 | Lewis et al. |
| 5,364,467 A | 11/1994 | Schmid et al. |
| 5,411,296 A * | 5/1995 | Mallik ........................ 283/86 |
| 5,424,119 A * | 6/1995 | Phillips et al. .............. 428/328 |
| 5,464,710 A | 11/1995 | Yang |
| 5,549,774 A | 8/1996 | Miekka et al. |
| 5,549,953 A | 8/1996 | Li |
| 5,571,624 A | 11/1996 | Phillips et al. |
| 5,591,527 A | 1/1997 | Lu |
| 5,624,076 A | 4/1997 | Miekka et al. |
| RE35,512 E | 5/1997 | Nowak et al. |
| 5,629,068 A | 5/1997 | Miekka et al. |
| 5,648,165 A | 7/1997 | Phillips et al. |
| 5,650,248 A | 7/1997 | Miekka et al. |
| 5,672,410 A | 9/1997 | Miekka et al. |
| 5,700,550 A | 12/1997 | Uyama et al. |
| 5,742,411 A * | 4/1998 | Walters ......................... 359/2 |
| 5,763,086 A | 6/1998 | Schmid et al. |
| 5,815,292 A | 9/1998 | Walters ......................... 359/2 |
| 5,856,048 A | 1/1999 | Tahara et al. |
| 5,858,078 A | 1/1999 | Andes et al. |
| 5,912,767 A | 6/1999 | Lee |
| 5,989,626 A | 11/1999 | Coombs et al. |
| 6,013,370 A | 1/2000 | Coulter et al. |
| 6,031,457 A | 2/2000 | Bonkowski et al. |
| 6,045,230 A | 4/2000 | Dreyer et al. |
| 6,068,691 A | 5/2000 | Miekka et al. |
| 6,112,388 A | 9/2000 | Kimoto et al. |
| 6,150,022 A * | 11/2000 | Coulter et al. .............. 428/403 |
| 6,157,489 A | 12/2000 | Bradley, Jr. et al. |
| 6,168,100 B1 | 1/2001 | Kato et al. |
| 6,241,858 B1 | 6/2001 | Phillips et al. |
| 6,242,510 B1 | 6/2001 | Killey |
| 6,243,204 B1 | 6/2001 | Bradley, Jr. et al. |
| 6,692,830 B2 | 2/2004 | Argoitia et al. .............. 428/403 |
| 6,712,399 B1 * | 3/2004 | Drinkwater et al. ........ 283/111 |
| 6,749,777 B2 | 6/2004 | Argoitia et al. .............. 252/582 |
| 6,761,959 B1 | 7/2004 | Bonkowski et al. ........ 428/156 |
| 2003/0087070 A1 | 5/2003 | Souparis |
| 2004/0081807 A1 | 4/2004 | Bonkowski et al ...... 428/195.1 |
| 2004/0094850 A1 | 5/2004 | Bonkowski et al. ....... 264/1.34 |
| 2004/0100707 A1 * | 5/2004 | Kay et al. ................... 359/883 |
| 2004/0105963 A1 | 6/2004 | Bonkowski et al. ..... 428/195.1 |

FOREIGN PATENT DOCUMENTS

| | | |
|---|---|---|
| EP | 0 756 945 | 2/1997 |
| WO | WO 98/12583 | 3/1998 |
| WO | WO 00/08596 | 2/2000 |
| WO | WO 02/00446 | 1/2002 |

OTHER PUBLICATIONS

Jeffery I. Zink, et al., "Optical Probes and Properties of Aluminosilicate Glasses Prepared By The Sol-Gel Method," Polym. Mater. Sci. Eng., pp. 204-208 (1989).

Don W. Tomkins, Kurz Hastings, "Transparent Overlays for Security Printing and Plastic ID Cards," pp. 1-8, Nov., 1997.

The Mearl Corporation brochure for "Mearl Iridescent Film," Peekskill, NY.

J.A. Dobrowolski; K.M. Baird; P.D. Carman; and A. Waldorf, "Optical Interference Coatings for Inhibiting of Counterfeiting," Optica Acta, 1973, vol. 20, No. 12, 925-937.

The R.D. Mathis Company Manual for "Thin Film Evaporation Source Reference," Long Beach, CA.

Minolta Manual for "Precise Color Communication, Color Control From Feeling to Instrumentation," pp. 18, 20, 22, 23, 46, 47, 48 and 49.

Frans Defilet, LGZ Landis & Gyr Zug Corporation, "Kinegrams 'Optical Variable Devices' (OVD's) For Banknotes, Security Documents and Plastic Cards," San Diego, Apr. 1-3, 1987.

S.P. McGrew, "Hologram Counterfeiting: Problems and Solutions," SPIE, vol. 1210 Optical Security and Anticounterfeiting Systems, 1990, pp. 66-76.

Rudolf L. van Renesse, "Security Design of Valuable Documents and Products," SPIE, vol. 2659, Jun. 1996, pp. 10-20.

Steve McGrew, "Countermeasures Against Hologram Counterfeiting," Internet site www.iea.com/nli/publications/countermeasures.htm, Jan. 6, 2000.

Roger W. Phillips, "Optically Variable Films, Pigments, and Inks," SPIE vol. 1323, Optical Thin Films III: New Developments, 1990, pp. 98-109.

Roger W. Phillips, and Anton F. Bleikolm, "Optical Coatings for Document Security," Applied Optics, vol. 35, No. 28, Oct. 1, 1996, pp. 5529-5534

J.A. Dobrowolski; F.C. Ho; and A. Waldorf, Research on Thin Film Anticounterfeiting Coatings at the National Research Council of Canada, Applied Optics, vol. 28, No. 15, Jul. 15, 1989, pp. 2702-2717.

J. Rolfe, Optically Variable Devices for Use on Bank Notes, SPIE, vol. 1210 Optical Security and Anticounterfeiting Systems, pp. 14-19, 1990.

OVD Kinegram Cor, "OVD Kinegram Management of Light to Provide Security," Internet site www.kiknegram.com/xhome/home.html, Dec. 17, 1999.

I.M. Boswarva, et al., "Roll Coater System for the Production of Optically Variable Devices (OVD's) for Security Applications," Proceedings, 33rd Annual Technical Conference, Society of Vacuum Coaters, pp. 103-109 (1990).

U.S. Appl. No. 11/047,389, filed Jan. 31, 2005, Phillips et al.

* cited by examiner

PATTERNED REFLECTIVE OPTICAL STRUCTURES

BACKGROUND OF THE INVENTION

1. Field of the Invention

The present invention is related generally to surface relief devices. More specifically, the present invention is related to devices such as holograms or diffractive gratings that are associated with a patterned reflective structure.

2. Background Technology

Diffraction patterns and embossments, and the related field of holograms, have wide-ranging practical applications due to their aesthetic and utilitarian visual effects. In general, diffraction gratings are essentially repetitive structures made of lines or grooves in a material to form a peak and trough structure. Desired optical effects within the visible spectrum occur when diffraction gratings have spaced grooves in the range of hundreds to thousands of lines per millimeter on a reflective surface. One decorative effect is the iridescent visual effect created by a diffraction grating.

Diffraction grating technology has been employed in the formation of two-dimensional holographic patterns that create the illusion of a three-dimensional image to an observer. Three-dimensional holograms have also been developed based on differences in refractive indices in a polymer using crossed laser beams, including one reference beam and one object beam. Such holograms are called volume holograms or 3D holograms. Furthermore, the use of holographic images on various objects to discourage counterfeiting has found widespread application.

There currently exist several applications for surfaces embossed with holographic patterns, which range from decorative packaging such as gift wrap, to security documents such as bank notes and credit cards. Two-dimensional holograms typically utilize diffraction patterns that have been formed on a plastic surface. In some cases, a holographic image that has been embossed on such a surface can be visible without further processing; however, it is generally necessary, in order to achieve maximum optical effects, to place a reflective layer, typically a thin metal layer such as aluminum, onto the embossed surface. The reflective layer substantially increases the visibility of the diffraction pattern embossment.

Every type of first order diffraction structure, including conventional holograms and grating images, has a major shortcoming even if encapsulated in a rigid plastic. When diffuse light sources, such as ordinary room lights or an overcast sky, are used to illuminate the holographic image, all diffraction orders expand and overlap so that the diffraction colors are lost and not much of the visual information contained in the hologram is revealed. What is typically seen is only a silver colored reflection from the embossed surface and all such devices look silvery or pastel, at best, under such viewing conditions. Thus, holographic images generally require direct specular illumination in order to be visualized. This means that for best viewing results, the illuminating light must be incident at the same angle as the viewing angle.

Since the use of security holograms has found widespread application, there exists a substantial incentive for counterfeiters to reproduce holograms that are frequently used in credit cards, banknotes, and the like. Thus, a hurdle that security holograms must overcome to be truly secure, is the ease at which such holograms can be counterfeited. One step and two step optical copying, direct mechanical copying and even re-origination have been extensively discussed over the Internet. Various ways to counteract these methods have been explored but none of the countermeasures, taken alone, has been found to be an effective deterrent.

A further problem with security holograms is that it is difficult for most people to identify and recollect the respective images produced by such holograms for verification purposes. The ability of the average person to authenticate a security hologram conclusively is compromised by the complexity of its features and by confusion with decorative diffractive packaging. Thus, most people tend to confirm the presence of such a security device rather than verifying the actual image. This provides the opportunity for the use of poor counterfeits or the substitution of commercial holograms for the genuine security hologram.

In other efforts to thwart counterfeiters, the hologram industry has resorted to more complex images such as producing multiple images as the security device is rotated. These enhanced images provide the observer with a high level of "flash" or aesthetic appeal. Unfortunately, this added complexity does not confer added security because this complex imagery is hard to communicate and recollection of such imagery is difficult, if not impossible, to remember.

It would therefore be of substantial advantage to develop improved security products that provide enhanced viewing qualities in various lighting conditions, and which are usable in various security applications to make counterfeiting more difficult.

SUMMARY OF THE INVENTION

The present invention is directed to optical structures that exhibit the effects of surface relief patterns, such as holograms or diffractive gratings, together with a pattern such as alphanumeric characters, bar codes, or graphical or pictorial designs, and additional optical effects in the regions around such pattern.

More specifically, an optical structure in accordance with the present invention includes a light transmissive substrate having a surface relief pattern applied thereon to provide a hologram or other surface relief-based structure. A patterned layer of a reflective material is applied onto portions of the surface relief pattern so as to form patterns or designs, such as alphanumeric characters, bars codes, or pictorial or graphical designs. The application of a patterned layer of the reflective material leaves portions of the surface relief pattern uncovered by reflector, or "exposed." An optically active coating is applied over the patterned layer of reflective material and the exposed portions of the surface relief pattern in order to provide desirable optical effects in the regions where the surface relief pattern is exposed to the optically active coating.

In some embodiments, the optically active coating is a color shifting thin film, or contains color shifting flakes. Optionally, the material of the optically active coating is index matched to the light transmissive substrate, which has the effect of optically erasing the effect of the surface relief pattern in the exposed regions.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is to be appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

The present invention is directed related to optical structures including surface relief patterns that provide optical effects such as holograms; a patterned reflective structure underlying the surface relief pattern; and an optically active coating underlying the patterned layer and those portions of the surface relief pattern that are not covered by the patterned layer. The resulting optical structures exhibit unique optical effects.

The figures illustrate various aspects of the invention in a schematic form, wherein like structures are provided with like reference designations.

Figure 1:
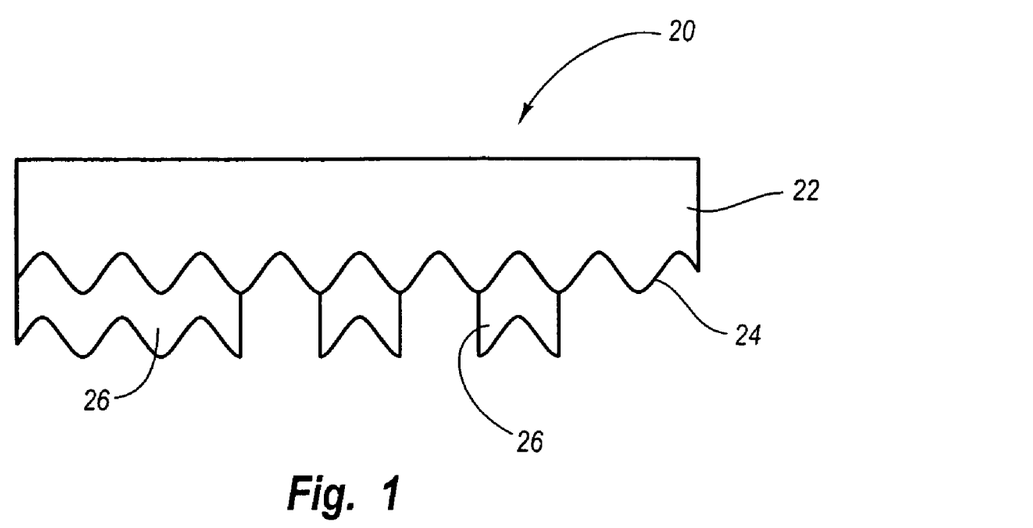
FIG. 1 is a schematic depiction of an optical structure according to one embodiment of the present invention.

FIG. 1 depicts an optical structure 20, which includes a light transmissive layer 22 having a surface relief pattern 24 on the inner, or lower surface thereof.

A patterned reflective layer 26 is applied so as to underlie the surface relief pattern. The patterned reflective layer may be applied directly to the surface relief pattern, as illustrated, or there may optionally be one or more transmissive layers between the surface relief pattern and the patterned reflective layer.

By use of the term "patterned" reflective layer, it is meant that the reflective layer is applied over surface relief pattern 24 in a manner that forms a desired "pattern" or design. By way of non-limiting example, the patterned reflective layer can be formed in the shape of letters, numerals, bar codes and/or graphical or pictorial designs.

Light transmissive layer 22 is preferably composed of a material capable of accepting a relief structure directly on its surface. Suitable materials for layer 22 include plastic materials such as polyvinyl chloride, polycarbonate, polyacrylate, and PET type G.

The surface relief pattern 24 can take various forms including diffraction gratings, holographic patterns such as two-dimensional and three-dimensional holographic images, corner cube reflectors, zero order diffraction patterns, moire patterns, or other light interference patterns, including those based on microstructures having dimensions in the range from about 0.1 $\mu$m to about 10 $\mu$m, preferably about 0.1 $\mu$m to about 1 $\mu$m, and various combinations of the above such as hologram/grating images, or other interference patterns. For example, Kinegram® devices have two-dimensional, computer-generated images (available from OVD Kinegram Corp. of Switzerland) in which the individual picture elements are filled with light-diffracting microstructures. These microstructures are extremely fine surface modulations with typical dimensions of less than about 1 $\mu$m. In addition to conventional holograms, the present invention applies to any relief structure that may be embossed into a resin layer. This includes diffractive surfaces, "moth-eye" type structures, holograms that have multiple angles of view wherein each view has a different holographic feature or image, or may include high resolution embossing from a nickel master where the original shim was created by high resolution laser engraving.

The methods that can be used to form surface relief pattern 24 are well known by those skilled in the art. For example, a surface of layer 22 may be embossed by well known methods, such as by pressing it in contact with a heated nickel embossing shim at high pressure. Other methods include photolithography and molding of the plastic substrate against a patterned surface.

In one method, optical structure 20 can be produced from a thermoplastic film that has been embossed by heat softening the surface of the film and then passing the film through embossing rollers that impart the diffraction grating or holographic image onto the softened surface. In this way, sheets of effectively unlimited length can be formed with the diffraction grating or holographic image thereon. Alternatively, optical structure 20 can be made by passing a roll of plastic film coated with an ultraviolet (UV) curable polymer, such as PMMA, through a set of UV transparent rollers whereby the rollers set a pattern into the UV curable polymer and the polymer is cured by a UV light that passes through the UV transparent rollers.

Once light transmissive layer and associated surface relief structure is prepared, a reflective material is deposited in a desired pattern so as to form patterned reflective layer 26. It is presently preferred that the material of patterned reflective layer be a metal, such as aluminum, silver, nickel, silver-palladium, silver-copper alloy, copper, gold, and the like, although other reflective or even partially-reflective/partially-transmissive materials could be used. It is preferred that this layer be substantially opaque in order to improve the optical characteristics of the associated surface relief pattern, although it should be understood that it can be partially transmissive in order to obtain desired effects. In the instance where the reflective layer is-to be substantially opaque, the metal layer is typically formed to a thickness between about 50 to about 100 nm.

It is currently preferred that the patterned reflective layer be applied in the desired pattern/design using one of two methods. In one method, standard photolithography techniques are used, wherein a pattern is developed in a photoresist layer formed over the metal layer by ultraviolet curing through a mask, followed by treatment in aqueous alkali solution, such as a solution of sodium hydroxide (NaOH), to remove the photoresist layer. In another method, patterning of the metal layer is done in-line in a vacuum roll coater by using a gravure printed pattern of non-wetting oil on the embossed surface, whereby the patterned metal layer is created during the deposition process. The pattern is created by the pattern of oil evaporating as the metal deposits over the embossed surface. In those areas where the oil is absent, the metal will be deposited and adhere to the resin layer or substrate surface. In those areas on the surface where the oil is present, the oil evaporates due to the heat of condensation of the depositing metal, and the relief structure such as a hologram remains free of the metal layer on those areas, creating a non-metallized relief structure.

While these two methods of forming the patterned reflective layer are currently preferred, it will be appreciated that those of ordinary skill in the art having an understanding of the desired structures as taught herein may identify alternative methods for forming a patterned reflective layer.

Figure 2:
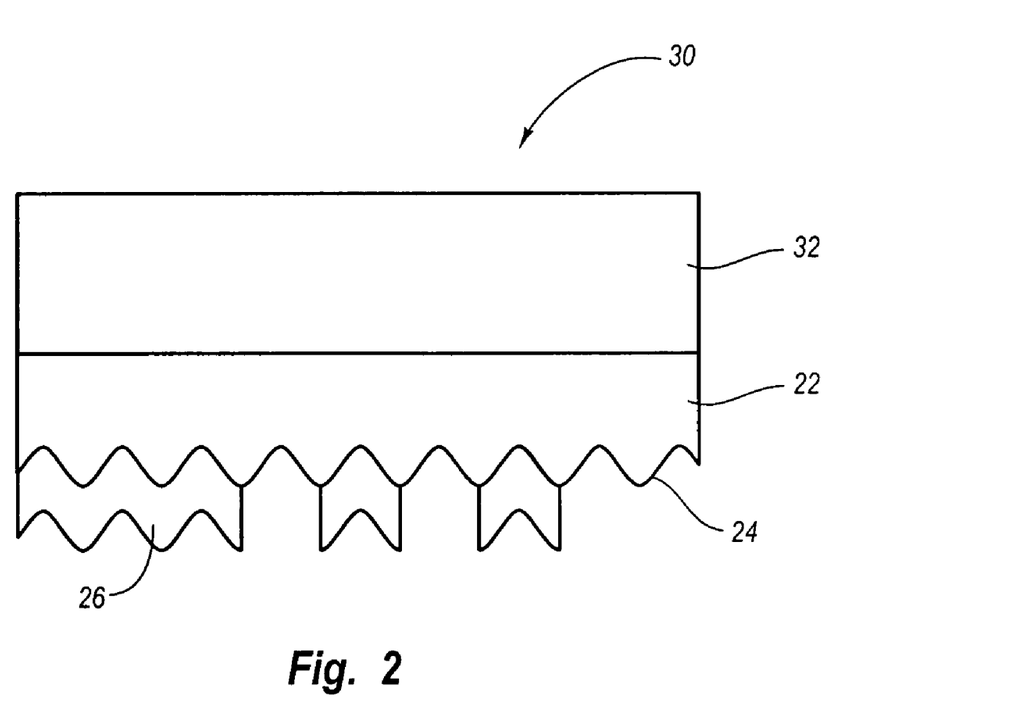
FIG. 2 is a schematic depiction of an optical structure according to another embodiment of the present invention.

FIG. 2 depicts a structure similar to that of FIG. 1, but shows the addition of a light transmissive substrate 32 overlying light transmissive layer 22 in order to form optical structure 30. This embodiment is particularly useful when the material used to form light transmissive layer 22 is soft, in which case substrate 32 can provide physical protection and/or rigidity to the optical structure. Once again, the inner surface of light transmissive layer 22 has a surface relief pattern formed thereon, and is associated with a patterned reflective layer.

It is presently preferred that a moldable thermoformable material be used to form light transmissive substrate 32, which include, for example, plastics such as polyesters, polyethylene terephthalate (PET) such as PET type G, polycarbonate, acrylics such as polyacrylates including polymethyl methacrylate (PMMA), polyvinyl chloride, polyvinylidene chloride, polystyrene, cellulose diacetate and cellulose triacetate, and mixtures or copolymers thereof, and the like. In one preferred embodiment, light transmissive substrate 32 is substantially composed of a transparent material such as polycarbonate. The substrate 32 is formed to have a suitable thickness of about 3 $\mu$m to about 100 $\mu$m, and preferably a thickness of about 12 $\mu$m to about 25 $\mu$m. Although substrate 32 is depicted as being formed of a single layer, it can be formed of multiple layers of substrate materials.

Figure 3:
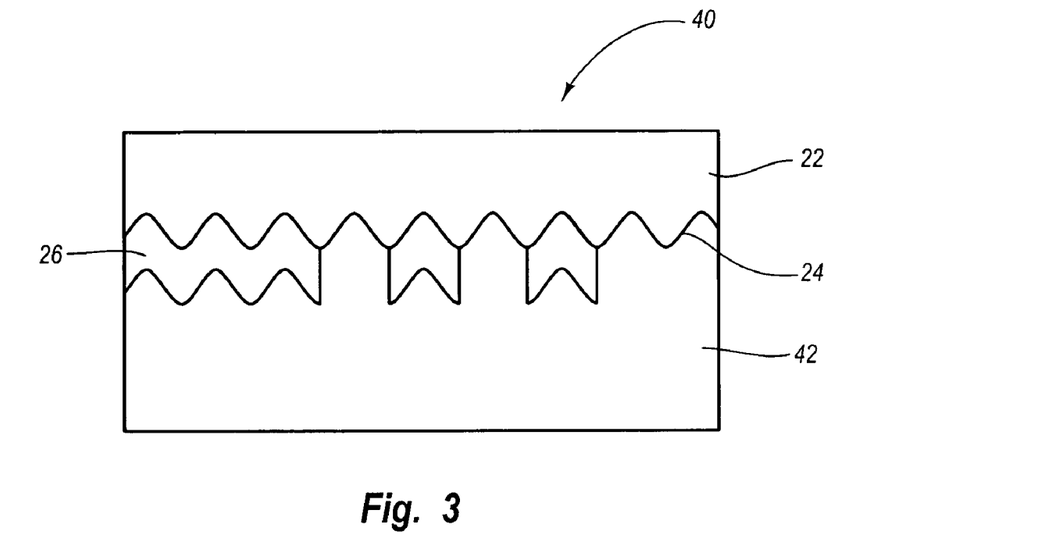
FIG. 3 is a schematic depiction of an optical structure according to a further embodiment of the present invention.

FIG. 3 depicts an optical structure similar to that of FIG. 1, but with the addition of a layer 42 overlying patterned reflective layer 26 and exposed portions of the surface relief pattern 24. Layer 42 may serve to protect patterned reflective layer 26 and surface relief pattern 24, and may add optical characteristics to optical structure 40. For example, layer 42 may be colored, transmissive and/or opaque. Layer 42 may be a simple layer, or may contain complex structure. When layer 42 adds optical characteristics to the structure of FIG. 1, it is referred to herein as an "optically active" coating.

Figure 4:
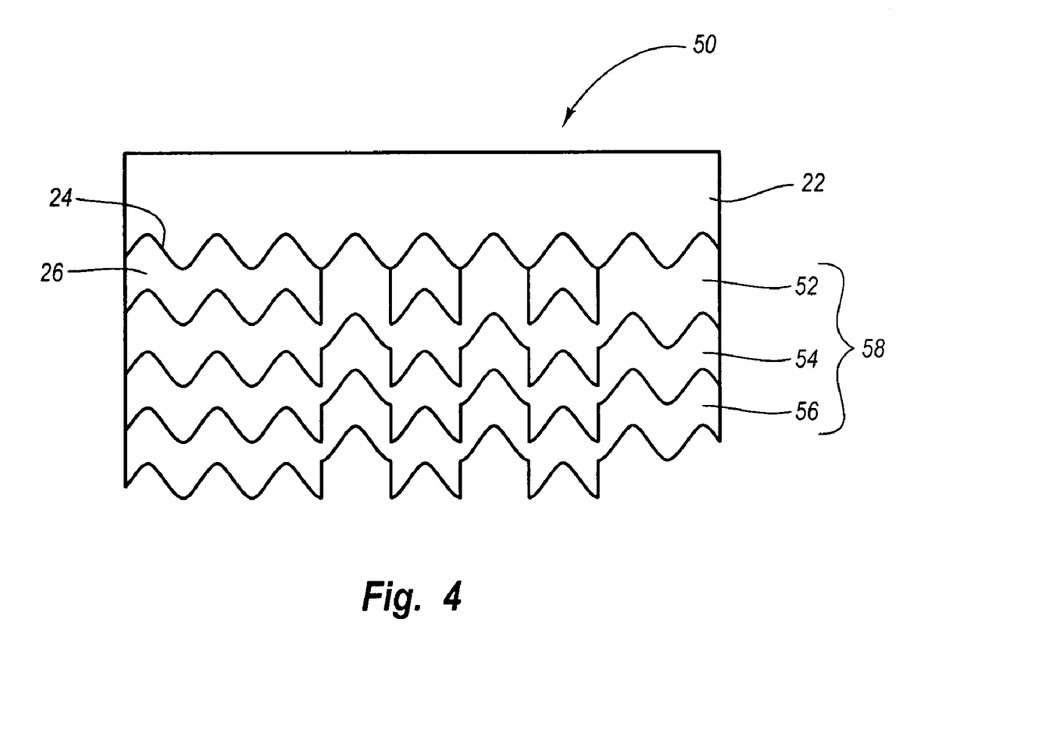
FIG. 4 is a schematic depiction of an optical structure according to another embodiment of the present invention.

An example of the use of an optically active coating is shown in FIG. 4, which depicts an optical structure 50 comprising a light transmissive layer 22 having a surface relief pattern 24 and a patterned reflective layer 26. A thin film optical stack is used to form an optically active multilayer optical coating 58, which is applied to the patterned reflective layer and exposed portions of the surface relief pattern.

In FIG. 4, the multilayer optical coating 58 consists of a partially absorbing/partially transmissive layer 52, hereinafter referred to as the "absorber" layer, an optical dielectric layer 54, and reflector layer 56. Following the teachings of patents such as U.S. Pat. No. 5,135,812, incorporated herein in its entirety by reference, these layers will add a color shifting feature to optical structure 50, meaning that the color changes depending upon viewing angle.

It has been discovered that this structure provides useful optical properties. In those areas where the patterned reflective layer overlies the surface relief pattern, optical effects are generated just as would be observed in connection with a structure according to FIG. 1. However, in the areas of the surface relief pattern that do not have an underlying reflective layer, the multilayer optical coating will provide unique optical effects. For example, in the case of a patterned aluminum reflector layer underlying a hologram-exhibiting surface relief pattern, a standard holographic set of colors are seen, which typically show the colors of the rainbow, wherein the colors move from blue to red as the angle of tilt increases. In those areas where multilayer optical coating 58 has been applied directly onto the surface relief pattern, the hologram now adopts different visual colors, since coating 58 creates specific colors that modify the diffractive/interference effects of the hologram.

Absorber layer 52 is formed to have a suitable thickness of about 30–300 Angstroms, and preferably a thickness of about 50–100 Angstroms. The absorber layer can be composed of a semi-opaque material such as a grey metal, including metals such as chromium, nickel, titanium, vanadium, cobalt, and palladium, as well as other metals such as iron, tungsten, molybdenum, niobium, aluminum, and the like. Various combinations and alloys of the above metals may also be utilized, such as inconel (Ni—Cr—Fe), or nichrome. Other absorber materials may also be employed in absorber layer 52 including metal compounds such as metal sub-oxides, metal sulfides, metal nitrides, metal carbides, metal phosphides, metal selenides, metal silicides, and combinations thereof, as well as carbon, germanium, ferric oxide, metals mixed in a dielectric matrix, and the like.

Optical dielectric layer 54 can be formed on absorber layer 18 by a conventional deposition process such as PVD using electron beam or resistive heating, chemical vapor deposition (CVD), plasma enhanced chemical vapor deposition (PECVD), reactive DC sputtering, RF sputtering, or the like. The dielectric layer is formed to have an effective optical thickness for imparting color shifting properties to optical structure 50. Typically, the optical thickness of a layer is expressed in terms of a quarter wave optical thickness (QWOT) with respect to a desired wavelength at which a QWOT condition occurs. The optical thickness of dielectric layer 54 can range from about 2 QWOT at a design wavelength of about 400 nm to about 9 QWOT at a design wavelength of about 700 nm, and preferably 2–6 QWOT at 400–700 nm, depending upon the color shift desired. Suitable materials for dielectric layer 54 include those having a "high" index of refraction, defined herein as greater than about 1.65, as well as those having a "low" index of refraction, which is defined herein as about 1.65 or less.

Examples of suitable high refractive index materials for dielectric layer 54 include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), haffiium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like. Suitable low refractive index materials for dielectric layer 54 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

Reflector layer 56 can be formed on dielectric layer 54 by a conventional deposition process such as PVD, sputtering, or the like. The reflector layer 56 is preferably formed to have a thickness of about 300–1000 Angstroms, and preferably a thickness of about 500–1000 Angstroms. Reflector layer 56 is preferably composed of an opaque, highly reflective metal such as aluminum, silver, copper, gold, platinum, niobium, tin, combinations and alloys thereof, and the like, depending on the color effects desired. It should be appreciated that other metals could also be used, such as chromium, nickel, titanium, vanadium, cobalt, and palladium, or cobalt-nickel alloys, could also be used at an appropriate thickness for reflector layer 56, as could other reflective materials.

Figure 5:
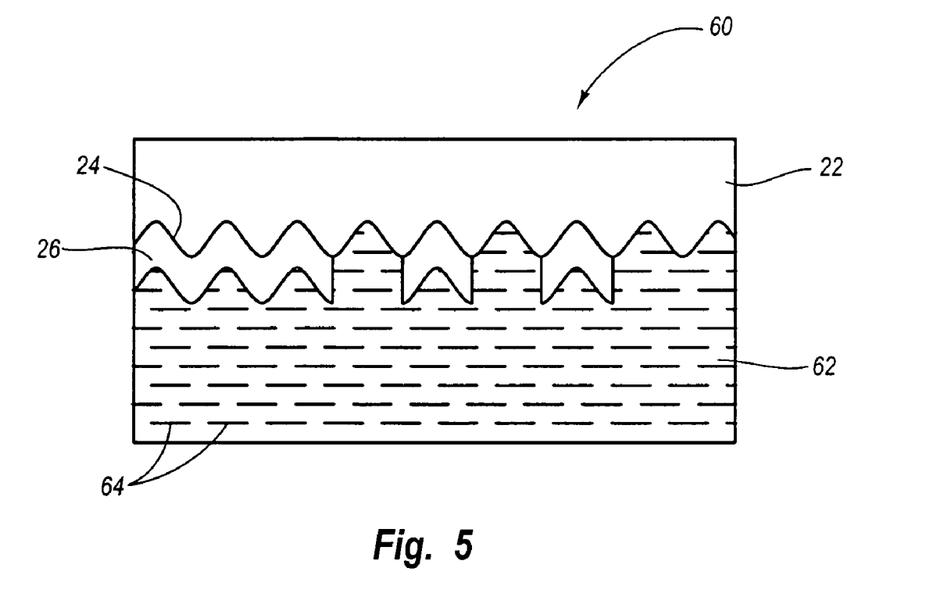
FIG. 5 is a schematic depiction of an optical structure according to yet another embodiment of the present invention.

Another embodiment of an optical structure is depicted schematically in FIG. 5. FIG. 5 shows an optical structure 60 having a surface relief pattern 24 formed on a transmissive layer 22, and a patterned reflective layer 26 underlying portions of the surface relief pattern. A transmissive substance containing a suspension of flakes 64 is applied under the patterned reflective layer and exposed portions of the optical relief pattern, which when hardened or cured forms a transmissive layer 62 containing suspended flakes 64. The particular flakes utilized need not be flat as shown, but can be any desired pigment or particle, or could be utilized in different spatial orientations, in order to provide desirable optical effects. However, the strongest color shifting effects will occur when the flakes have a high aspect ratio and are flat so that they will orient parallel to layer 22. One suitable color shifting flake for use in connection with the embodiment of FIG. 5 is of the type described in U.S. Pat. No. 5,135,812, which has heretofore been incorporated herein by reference.

The effect of suspending color shifting flakes in layer 62 results in color shifting effects in addition to the effects observed by reason of the combination of the surface relief pattern 24 and patterned reflective layer 26. The use of suspended flakes rather than a continuous structure such as shown in FIG. 4 adds an additional level of optical effects, depending upon such factors as how heavily the transmissive layer 62 is loaded with flakes 64, the size and aspect ratio of flakes 64, the optical characteristics of flakes 64, as well as other characteristics of the flakes.

Figure 6:
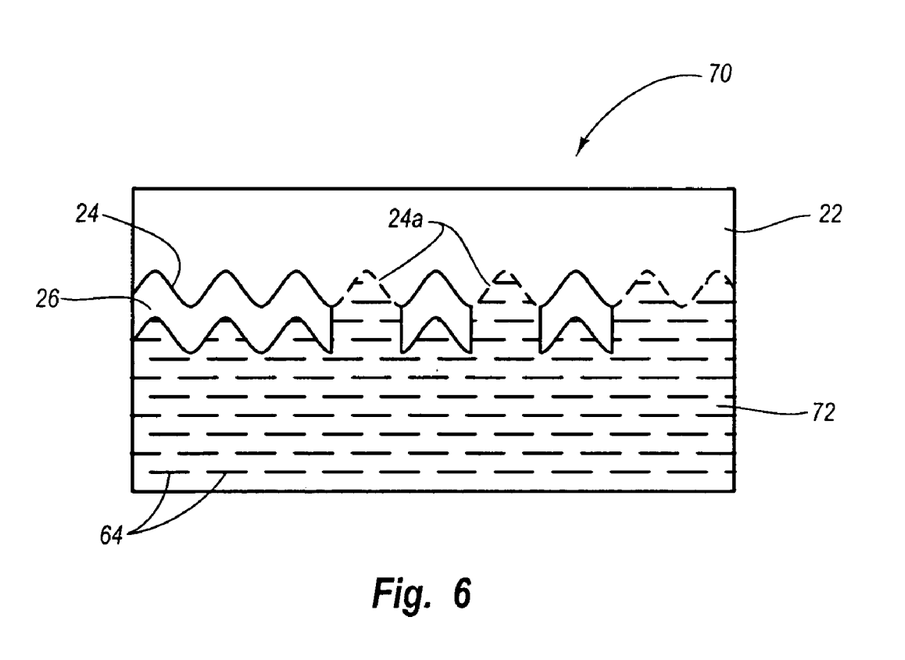
FIG. 6 is a schematic depiction of an optical structure according to a further embodiment of the present invention.

FIG. 6 depicts an optical structure 70 that is similar to optical structure 60 of FIG. 5, the difference being that the embodiment of FIG. 6 uses a material to form transmissive layer 72 that has an index of refraction matched to the index of refraction of transmissive layer 22. The effect of this index matching is to effectively "erase" the optical boundary between layers 22 and 72, as illustrated in FIG. 6 through the use of dotted lines. Stated another way, the combination of surface relief pattern 24 and patterned reflector 26 will result in the optical effects discussed above, but the application of an index-matched material 72 onto pattern 24 will not exhibit the optical effects associated with the surface relief pattern. Hence, in the embodiment of FIG. 6, the only optical effects observable in the portion of the surface relief pattern not covered by patterned reflector layer 26 will be those optical effects caused by flakes 64 that are suspended in material 72.

It should be appreciated that the use of an index-matching layer may be used in connection with the embodiment of FIG. 3, with the effect that optical effects will be observed in the region where patterned reflector 26 is applied to surface relief pattern 24, but no such surface relief effects would be observed in the region where no reflector overlies the surface relief pattern.

It should also be appreciated in view of the teachings herein that a variety of effects may be obtained by selecting a combination of features such as those described above. For example, one might choose to put surface relief pattern 24 only on portions of layer 22, or one may choose to have the surface relief pattern cover the entire surface thereof. Different types of surface relief patterns could be used at different locations on transmissive layer 22. Different materials may be used to form different portions of the patterned reflector 26 in order to obtain different optical effects. More than one type of flake 64 might be used rather than flakes of a single composition and structure, or one could put one type of flake in one region and a different type of flake in another region of the optical structure. Multilayer stacks of various types could be used to overly the combination of the surface relief pattern 24 and patterned reflector 26 in order to provide desirable optical effects. For example, the thin film optical stack may include other optical coatings, such as all dielectric systems wherein not only optical shifts are seen, but also an infrared signature will be observable and can act as a covert security feature.

Figure 7A:
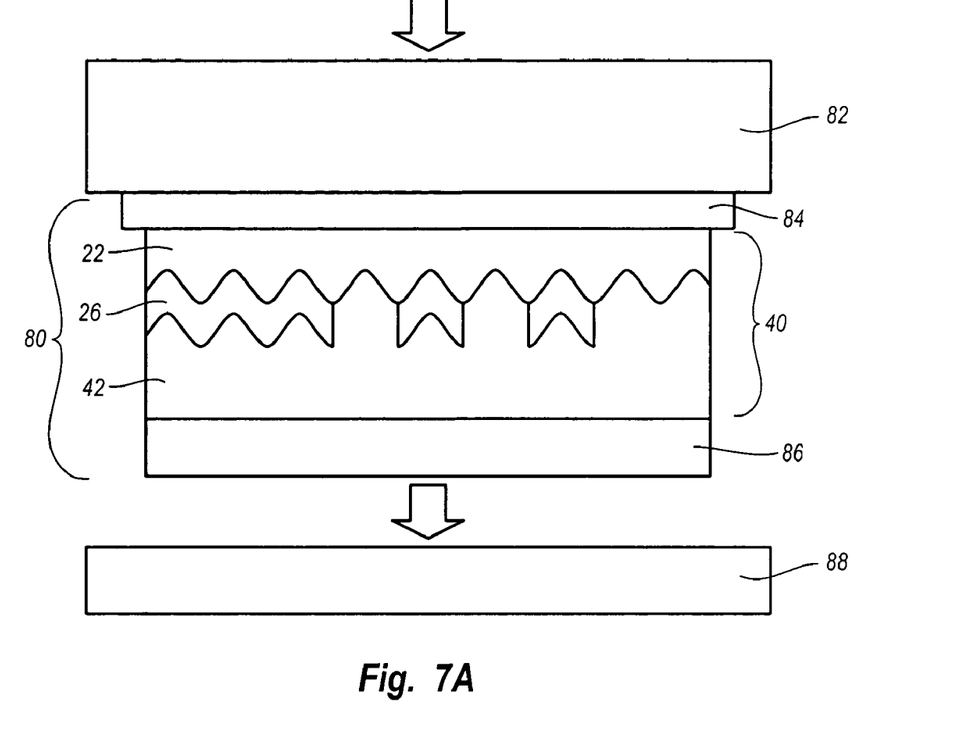
FIGS. 7A and 7B are schematic depictions of a security article according to another embodiment of the present invention.
Figure 7B:
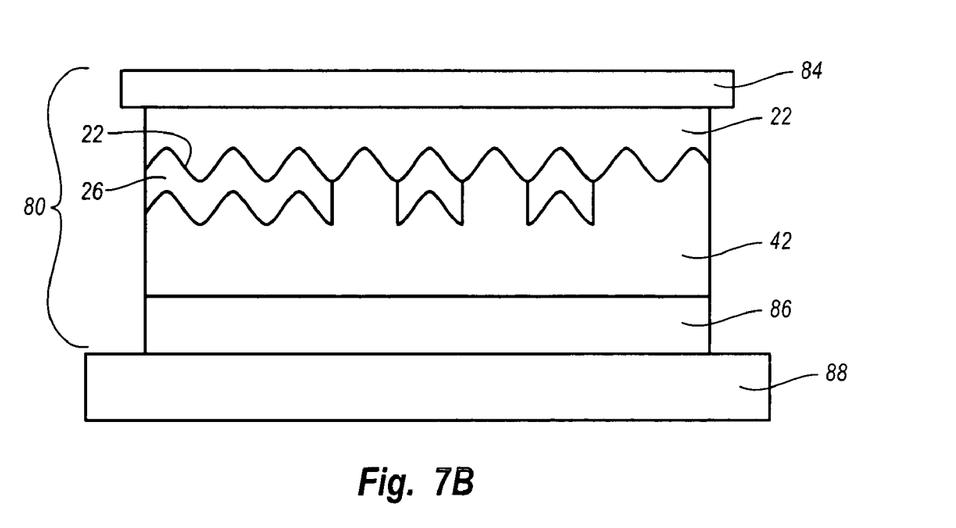

FIGS. 7A and 7B depict the formation of a hot-stamp foil utilizing features of the present invention. Hot-stamp devices are particularly useful for the protection of security documents, such as currency, checks, visas, passports, diplomas, identification cards, and the like. Hot-stamp devices are also useful to assist in brand protection in the area of pharmaceuticals, cosmetics, electronics, software, apparel, or any other product that has the potential for being counterfeited. In the latter instances, the hot-stamp device would be affixed to the box, container or to the item itself.

FIG. 7A depicts one form of a hot-stamp device 80 according to the present invention. By way of example, an optical structure 40, such as shown in FIG. 3, may be sandwiched between a carrier sheet 82 and a thermal release layer 84, on one side, and a thermally activated adhesive 86 on the other side. FIG. 7A depicts the application of hot-stamp device 80 onto a security document 88. FIG. 7B depicts the result of applying this structure, which not only provides visual appeal but also has the advantage that it cannot be easily counterfeited because the technologies of high resolution embossing as, for example, holography, patterning of a design, and that of the optically active coating must be all present in order for the device to have the same optical characteristics as an authentic device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical structure comprising:
   a light transmissive substrate having a first surface and an opposing second surface, the second surface having a surface relief pattern formed thereon;
   a patterned layer of a reflective material applied onto portions of the surface relief pattern of the light transmissive substrate, such that some portions of the surface relief pattern are covered by the reflective material, and other portions of the surface relief pattern are exposed; and an optically active color-shifting coating underlying the patterned layer and exposed portions of the surface relief pattern, wherein the color shifting coating has a visibly changing color with a change in viewing angle or a change of angle of incident light.

2. An optical structure as defined in claim 1, wherein the color shifting coating includes a reflective aluminum layer.

3. An optical structure as defined in claim 1, wherein the optically active coating is a thin film optical stack.

4. An optical structure as defined in claim 3, wherein the thin film optical stack includes:
   a partially absorbing/partially transmissive layer;
   a dielectric layer; and
   a reflector layer.

5. An optical structure as defined in claim 1, wherein the optically active coating contains flakes that add desirable optical effects to the exposed portions of the surface relief pattern.

6. An optical structure as defined in claim 5, wherein the flakes are a thin film optical stack including:
   a partially absorbing/partially transmissive layer;
   a dielectric layer; and
   a reflector layer.

7. An optical structure as defined in claim 1, wherein the optically active coating has an index of refraction substantially matched to the index of refraction of the light transmissive substrate, so that the optical effects of the surface relief pattern will not be exhibited in the exposed portions of the surface relief pattern.

8. An optical structure as defined in claim 5, wherein the optically active coating has an index of refraction substantially matched to the index of refraction of the light transmissive substrate, so that the optical effects of the surface relief pattern will not be exhibited in the exposed portions of the surface relief pattern.

9. An optical structure as defined in claim 1, wherein the patterned layer of reflective material is opaque.

10. An optical structure as defined in claim 1, wherein the patterned layer of reflective material is applied so as to form a pictorial design.

11. An optical structure as defined in claim 1, wherein the patterned layer of reflective material is applied so as form alphanumeric characters.

12. An optical structure as defined in claim 1, wherein the patterned layer of reflective material is applied so as to form a graphical design.

13. An optical structure as defined in claim 1, wherein the surface relief pattern is selected from the group consisting of a diffraction grating pattern, holographic image pattern, corner cube reflector, zero order diffraction pattern, moiré pattern, and combinations thereof.

14. An optical structure comprising:
   a light transmissive substrate having a first surface and an opposing second surface, the second surface having a surface relief pattern formed thereon;
   a patterned layer of a reflective material applied onto portions of the surface relief pattern of the light transmissive substrate, such that some portions of the surface relief pattern are covered by the reflective material, and other portions of the surface relief pattern are exposed; and
   a coating underlying the patterned layer and exposed portions of the surface relief pattern having an index of refraction substantially matched to the index of refraction of the light transmissive substrate, so that the optical effects of the surface relief pattern will not be exhibited by the exposed portions of the surface relief pattern, wherein the coating is a color-shifting coating having a visibly changing color with a change in viewing angle or a change of angle of incident light.

* * * * *